(12) United States Patent
Ganfield (10) Patent No.: US 9,548,857 B2
(45) Date of Patent: *Jan. 17, 2017

(54) INITIALIZING A DESCRAMBLER

(71) Applicant: International Business Machines Corporation, Armonk, NY (US)

(72) Inventor: Paul A. Ganfield, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/833,485

(22) Filed: Aug. 24, 2015

(65) Prior Publication Data

US 2016/0352503 A1    Dec. 1, 2016

Related U.S. Application Data

(63) Continuation of application No. 14/721,947, filed on May 26, 2015.

(51) Int. Cl.
 *H04L 7/00* (2006.01)

(52) U.S. Cl.
 CPC .................. *H04L 7/0087* (2013.01)

(58) Field of Classification Search
 USPC ........................................ 375/262, 149, 260
 See application file for complete search history.

(56) References Cited

U.S. PATENT DOCUMENTS

| 5,530,959 | A | 6/1996 | Amrany |
| 7,398,287 | B2 * | 7/2008 | An ................ G06F 7/584 375/149 |

(Continued)

FOREIGN PATENT DOCUMENTS

| EP | 0571753 A2 | 12/1993 |
| EP | 0723373 A2 | 7/1996 |

(Continued)

OTHER PUBLICATIONS

Anthapadmanabhan, N. Prasanth et al., Power Scalable Descrambling Methods for Bit-interleaved TDM Networks, 2013 IEEE International Conference on Communications, Jun. 2013, pp. 4169-4173, IEEE, Piscataway, United States.

(Continued)

*Primary Examiner* — Eva Puente
(74) *Attorney, Agent, or Firm* — Patterson + Sheridan, LLP (57) ABSTRACT

Embodiments herein describe techniques for synchronizing LFSRs located on two compute devices. To synchronize the LFSRs, a first one of the compute devices may transmit a first training block that includes a predefined bit sequence. The training block is scrambled by a transmitting (TX) LFSR on the first compute device and then transmitted to the second compute device. The second compute device performs an XOR operation to recover the outputs of the TX LFSR that were used to scramble the data. The second compute device can use the outputs of the TX LFSR to determine future outputs of the TX LFSR. These future outputs are then used to initialize a receiving (RX) LFSR on the second compute device. Now, when subsequent training blocks are received, the second compute device can use the initialized RX LFSR to descramble the scrambled training blocks.

7 Claims, 6 Drawing Sheets

(56) References Cited

U.S. PATENT DOCUMENTS

| | | |
|---|---|---|
| 8,627,156 B1 | 1/2014 | Erickson |
| 2005/0265430 A1* | 12/2005 | Ozluturk ............... G06F 13/374 375/145 |
| 2007/0239812 A1* | 10/2007 | Lablans ................. G06F 7/582 708/252 |
| 2009/0136034 A1 | 5/2009 | Gaal et al. |
| 2009/0252326 A1 | 10/2009 | Buchmann et al. |
| 2009/0323722 A1* | 12/2009 | Sharma ............... G06F 13/4286 370/470 |
| 2010/0251001 A1 | 9/2010 | Drescher et al. |
| 2011/0113293 A1 | 5/2011 | Ikeda |
| 2011/0142238 A1 | 6/2011 | Wang et al. |
| 2011/0208954 A1 | 8/2011 | Barrett et al. |
| 2012/0146989 A1 | 6/2012 | Whitby-Strevens |
| 2012/0213374 A1 | 8/2012 | Ikeda et al. |
| 2014/0126919 A1 | 5/2014 | Anthapadmanabhan et al. |
| 2014/0269954 A1 | 9/2014 | Whitby-Strevens |
| 2014/0321585 A1* | 10/2014 | Lablans ................. H03K 23/54 375/354 |
| 2015/0312037 A1 | 10/2015 | Newman |

FOREIGN PATENT DOCUMENTS

| | | | |
|---|---|---|---|
| GB | 2435334 A | 8/2007 | |
| WO | 2009046330 A1 | 4/2009 | |

OTHER PUBLICATIONS

Wu, Wei et al., A High Performance Serial ATA Host Controller, 2008 International Conference on Computer Science and Software Engineering, Dec. 2008, pp. 18-23, IEEE, Piscataway, United States.

Islam, Monirul et al., Analysis of Verilog Modelling and Simulation of Developed 16-bit and 23-bit LFSR Based Data Scrambler and Descrambler for 2.5GT/s and 5GT/s and 8GT/s Data Rate with Minimum Glitch, International Journal of Scientific & Engineering Research, May 2013, vol. 4, Issue 5, pp. 1730-1733, International Journal of Scientific & Engineering Research, United States.

U.S. Application entitled Initializing a Descrambler, filed May 22, 2015.

U.S. Appl. No. 14/833,458, entitled "Initializing a Descrambler", filed Aug. 24, 2015.

U.S. Appl. No. 14/721,738, entitled "Initializing a Descrambler", filed May 26, 2015.

U.S. Appl. No. 14/721,947, entitled "Initializing a Descrambler", filed May 26, 2015.

IBM "List of IBM Patents or Patent Applications Treated as Related".

* cited by examiner

INITIALIZING A DESCRAMBLER

CROSS-REFERENCE TO RELATED APPLICATIONS

This application is a continuation of co-pending U.S. patent application Ser. No. 14/721,947, filed May 26, 2015. The aforementioned related patent application is herein incorporated by reference in its entirety.

BACKGROUND

The present invention relates to initializing a linear feedback shift register (LFSR) in a descrambler, and more specifically, to identifying a future state of the LFSR by comparing received scrambled data to expected data.

High speed serial (HSS) links are used for communications in various known computer chips and computer systems. A given computer chip may include multiple instances of a specific HSS link using the same interface protocol. Many HSS interfaces utilize LFSRs to scramble the data that is transmitted. This scrambling provides many advantages such as clock retention and improving DC balance; however, synchronization is required to accurately descramble the received data bit stream.

SUMMARY

One embodiment of the present invention is a method that includes receiving on a first compute device training data scrambled using a transmitting LFSR on a second compute device and determining a first set of past output values used by the transmitting LFSR to scramble the first training data by comparing the first training data with expected data stored on the first compute device. The method includes determining future output values of the transmitting LFSR based on the first set of past output values, receiving on the first compute device second training data scrambled using the transmitting LFSR, and determining a second set of past output values used by the transmitting LFSR to scramble the second training data by comparing the second training data with the expected data. Upon determining the future output values match the second set of past output values, the method synchronizes a receiving LFSR on the first compute device to the transmitting LFSR.

Another embodiment of the present invention is a compute device that includes a receiving LFSR, a receiver interface configured to receive first and second training data, where the first and second training data were scrambled using a transmitting LFSR on a separate compute device, and a LFSR state calculator. The calculator is configured to determine a first set of past output values used by the transmitting LFSR to scramble the first training data by comparing the first training data with expected data stored on the first compute device and determine future output values of the transmitting LFSR based on the first set of past output values. The calculator is also configured determine a second set of past output values used by the transmitting LFSR to scramble the second training data by comparing the second training data with the expected data and, upon determining the future output values match the second set of past output values, synchronize the receiving LFSR to the transmitting LFSR.

Another embodiment of the present invention is a computer program product for synchronizing a receiving LFSR which includes computer-readable program code executable to receive on a first compute device first training data scrambled using a transmitting LFSR on a second compute device, determine a first set of past output values used by the transmitting LFSR to scramble the first training data by comparing the first training data with expected data stored on the first compute device, and determine future output values of the transmitting LFSR based on the first set of past output values. The computer program product also includes program code executable to receive on the first compute device second training data scrambled using the transmitting LFSR and determine a second set of past output values used by the transmitting LFSR to scramble the second training data by comparing the second training data with the expected data. Upon determining the future output values match the second set of past output values, the computer program product includes program code executable to synchronize a receiving LFSR on the first compute device to the transmitting LFSR.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments herein describe techniques for synchronizing LFSRs located on two compute devices that communicate by transmitting scrambled data on serial links (e.g., HSS links). Before transmitting data to a receiving compute device, a transmitting compute device may use a LFSR to scramble the data. Doing so may prevent the compute device from transmitting a long string of logical ones or zeros which may reduce the DC balance on the link or make clock retention more difficult. The receiving compute device descrambles the data using a LFSR that is synchronized with the LFSR that scrambled the data to recover the original data.

To synchronize the LFSRs, a first one of the compute devices may transmit a first training block (e.g., training data) that includes a predefined bit sequence. The training block is scrambled by a transmitting (TX) LFSR on the first compute device and then transmitted to the second compute device. Instead of attempting to descramble the data, the second compute device performs an XOR operation to recover the outputs of the TX LFSR on the first compute device that were used to scramble the data. In one embodiment, the second compute device XORs the scrambled data with the expected training data. If the scrambled data was sent correctly across the serial link (i.e., there were no communication errors) than the result of this XOR operation is the output of TX LFSR on the first compute device. Because the operation performed by the LSFR is predictable, the second compute device can use the outputs of the TX LFSR to determine future outputs of the TX LFSR (e.g., the outputs of the TX LFSR that will be used to scramble the next training block). These future outputs are then used to initialize a receiving (RX) LFSR on the second compute device. Once initialized, when the second training block is received, the second compute device can use the RX LFSR to descramble the scrambled training block. If the descrambled data matches the expected data, then the TX LFSR on the first compute device is synchronized with the RX LFSR on the second compute device.

Figure 1:
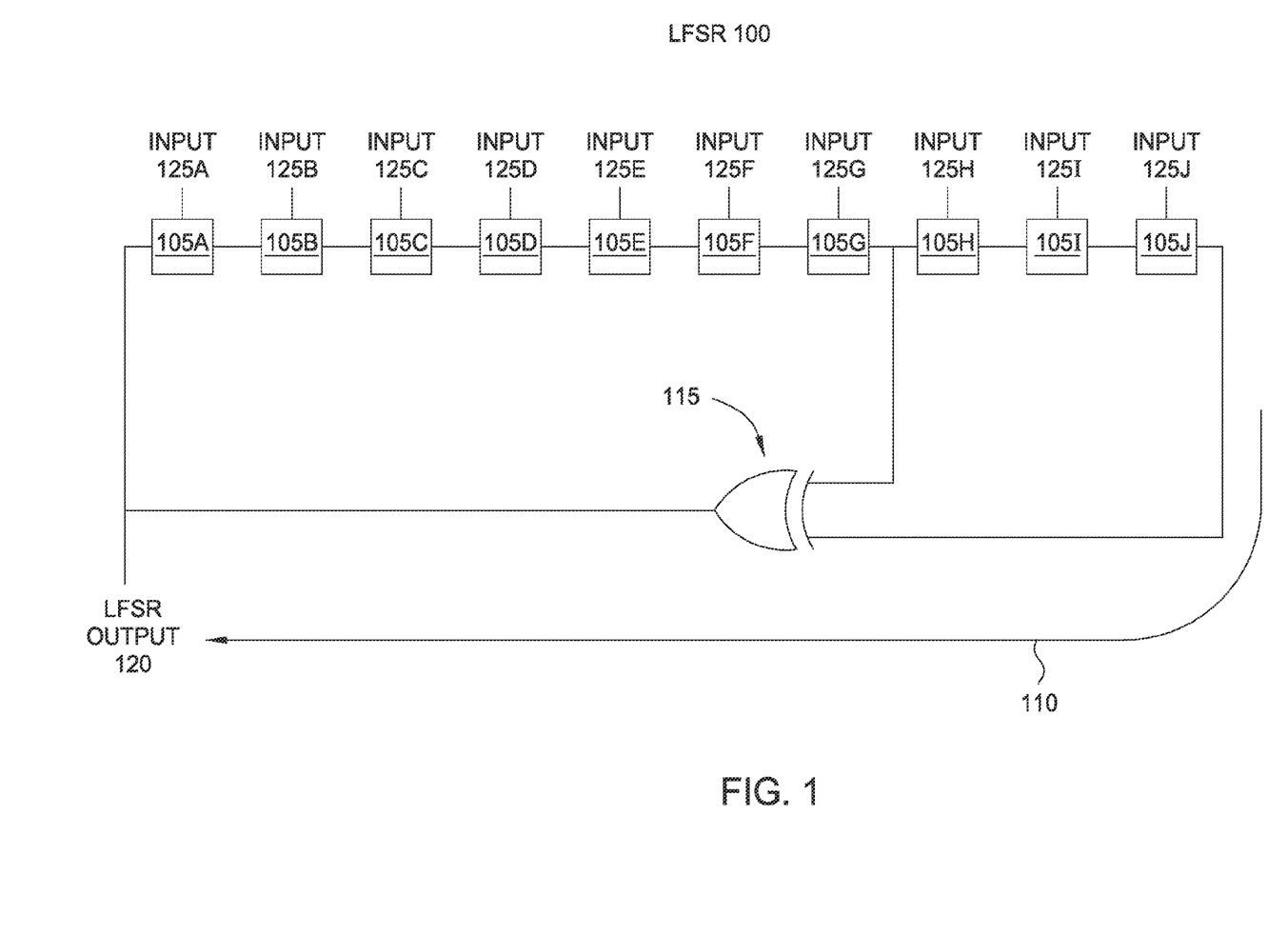
FIG. 1 illustrates a LFSR, according to one embodiment.

FIG. 1 illustrates a LFSR 100, according to one embodiment. LFSR 100 includes a plurality of registers 105 (ten in this example) with a feedback loop 110 connecting a first register 105A to a last register 105J to form a shift register. The LFSR output 120 is a linear function of its previous state. In this example, XOR logic 115 is used to perform the linear function according to the outputs of register 105J and register 105G. Although the FIG. 1 illustrates using the output of register 105G, any of the other register 105 outputs may be used—e.g., the outputs of registers 105H and 105J can be XORed to yield the LFSR output 120. FIG. 1 illustrates a simplified example of a LFSR logic, and in other embodiments, additional XOR gates and register outputs may be used to generate the LFSR output 120.

To initialize the LFSR 100, a seed may be loaded into registers 105 which sets the initial state of the LFSR 100. Because the LFSR 100 includes ten registers 105, the seed is a 10-bit value (which includes at least one non-zero bit) where each bit is loaded into a respective one of the registers 105 using initialization inputs 125A-125J. Each clock cycle, the values are shifted in a clockwise manner—e.g., the value in register 105A is shifted into registers 105B—except for the new value in the first register 105A which is set according to the output of the XOR logic 115 in the feedback loop 120. The stream of values produced at the output 120 of the XOR logic 115 is determined by the previous state of the LFSR. For example, if the seed is (0000001000), then the LFSR output 120 is 1 (i.e., 1 XOR 0=1). The state of LFSR 100 the next clock cycle is (1000000100) and the LFSR output 120 is 0 (i.e., 0 XOR 0=0).

Because the registers have a finite number of possible states ($2^N-1$ where N is the number of registers), the LFSR output 120 is a repeating cycle whose length depends on the number of registers 105. Even though the output 120 is predictable, LFSR 100 can nonetheless be used to produce a sequence of bits which appears random. As such, LFSRs may be used as a pseudo-random number generator, a pseudo-noise sequence generator, fast digital counters, scramblers, and whitening sequences. Moreover, although shown as including hardware elements in FIG. 1, LFSR 100 may be implemented in software or firmware.

Figure 2:
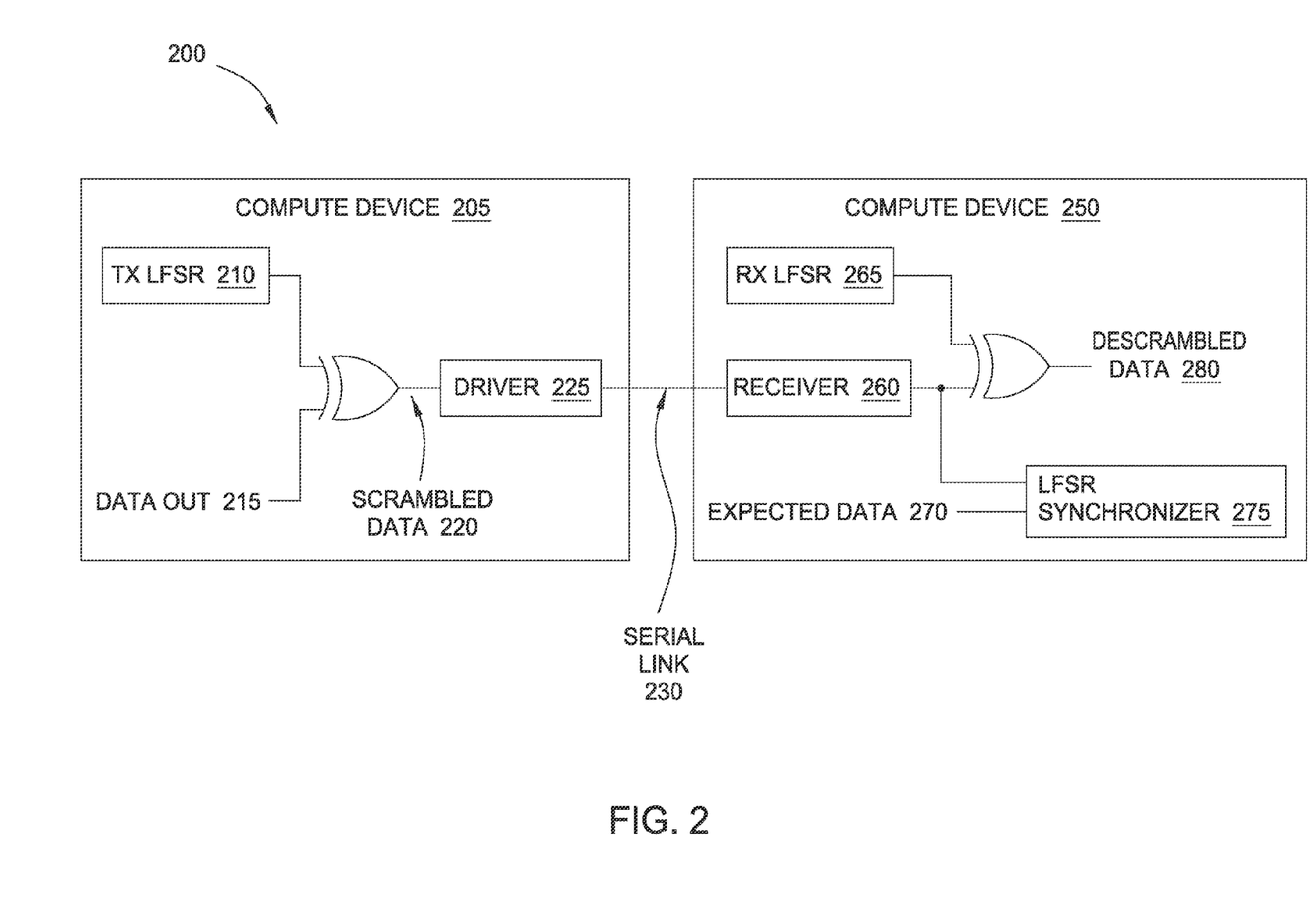
FIG. 2 is a block diagram of a system for synchronizing a RX LFSR to a TX LFSR, according to one embodiment.

FIG. 2 is a block diagram of a system 200 for synchronizing a RX LFSR 265 to a TX LFSR 210, according to one embodiment. System 200 includes a compute device 205 which is communicatively coupled via serial link 230 to a compute device 250. The devices 205, 250 may be computing systems (e.g., servers), integrated circuits, FPGAs, and the like. In this embodiment, compute device 205 is described as transmitting scrambled data to compute device 250. However, compute device 250 may also transmit scrambled data to compute device 205. For example, the serial link 230 may include two unidirectional wires where one wire is use to transmit data from compute device 205 to device 250 and the other wire is used to transmit data from compute device 250 to device 205. Furthermore, although one serial link 230 is shown, the compute devices may be coupled using multiple serial links (or lanes) for transmitting serial data.

Compute device 205 includes TX LFSR 210 whose output is fed into XOR logic in order to scramble data out 215 which represents any data that compute device 205 desires to transmit to compute device 250. For example, before normal data communication begins, the compute device 205 transmits training blocks which include training data used by compute device 250 to synchronize RX LFSR 265 to TX LFSR 210. For example, the training data may be a predefined bit-sequence (e.g., a 64 bit sequence) that is used for initializing the serial communication link 230. In FIG. 2, TX LSFR 210, data out 215 and the XOR gate form an additive scramble for generating scrambled data 220. That is, the pseudo-random output of TX LFSR 210 is XORed with data out 215 (i.e., the training data) to generate the scrambled data 220. In contrast to a self-synchronizing scrambler (also referred to a as a multiplier scrambler) where data out 215 would be fed through the TX LFSR 210 to generate the scrambled data (i.e., data out would be an input of the LFSR 210), in the additive scrambler, data out 215 is combined with the output of the LFSR 210. As mentioned above, by scrambling the data out 215, the compute device 205 may improve clock retention and DC balance on the serial link 230.

The scrambled data 220 is provided to a driver circuit 225 which then buffers and outputs the scrambled data 220 on serial link 230. That is, the scrambled data 220 is sent sequentially across the link 230 rather than in parallel. The serial link 230 may be a trace on a printed circuit board, part of a cable that includes multiple serial links, or part of a bus.

Compute device 250 includes a receiver 260, RX LFSR 265, XOR logic, and LFSR synchronizer 275. The receiver 260 receives the scrambled data 220 via the link 230 and may buffer the data. The receiver 260 may forward the scrambled data 220 either as it arrives or in data chunks. As an example of the latter, the receiver 260 may receive a 64 bit training block which is buffered and then forwarded in small data chunks (e.g., 10 bit chunks). The output the receiver 260, RX LFSR 265, and XOR logic may be considered as an additive descrambler that recovers the original data (i.e., data out 215) from the scrambled data 220.

In one embodiment, RX LFSR 265 may be functionally (and structurally) equivalent to TX LFSR 210. Stated differently, if the same seed value is used to initialize both LFSR 210 and LFSR 265, then the outputs of these LFSRs are identical. For example, TX LFSR 210 and RX LFSR may have the same circuit structure as LFSR 100 in FIG. 1. Thus, once synchronized, the output of RX LFSR 265 can be used to descramble the received data that was scrambled using the output of TX LFSR 210. That is, by XORing the output of RX LFSR 265 to the scrambled data 220, the resulting descrambled data 280 is the same as data out 215. In this manner, the two compute devices 205, 250 can transmit and receive scrambled data via the link 230.

However, before RX LFSR 265 can be used to descramble the scrambled data 220, the LFSR synchronizer 275 synchronizes RX LFSR 265 with TX LFSR 205. To do so, the synchronizer 275 uses the scrambled data and expected data 270 to generate register initialization values that are then used to initialize the registers of RX LFSR 265 in the same state as the registers of TX LFSR 210. For example, when synchronizing, compute device 205 outputs training data as data out 215 which is then scrambled and sent to compute device 250. In one embodiment, the training data is the same as the expected data 270 which is already stored in memory (not shown) on compute device 250. As will be discussed below, the LFSR synchronizer 275 compares the scrambled data to the expected (training) data 270 to determine an initialization state for RX LFSR 265 which matches the state of TX LFSR 210. After initializing RX LFSR 265, when compute device 205 transmits another (scrambled) training block, the scrambled data can be descrambled using the output of RX LFSR 265. If the descrambled data 280 matches the expected data 270 (i.e., the training data), the compute device 250 determines that RX LFSR 265 is in synch with TX LFSR 210.

Figure 3:
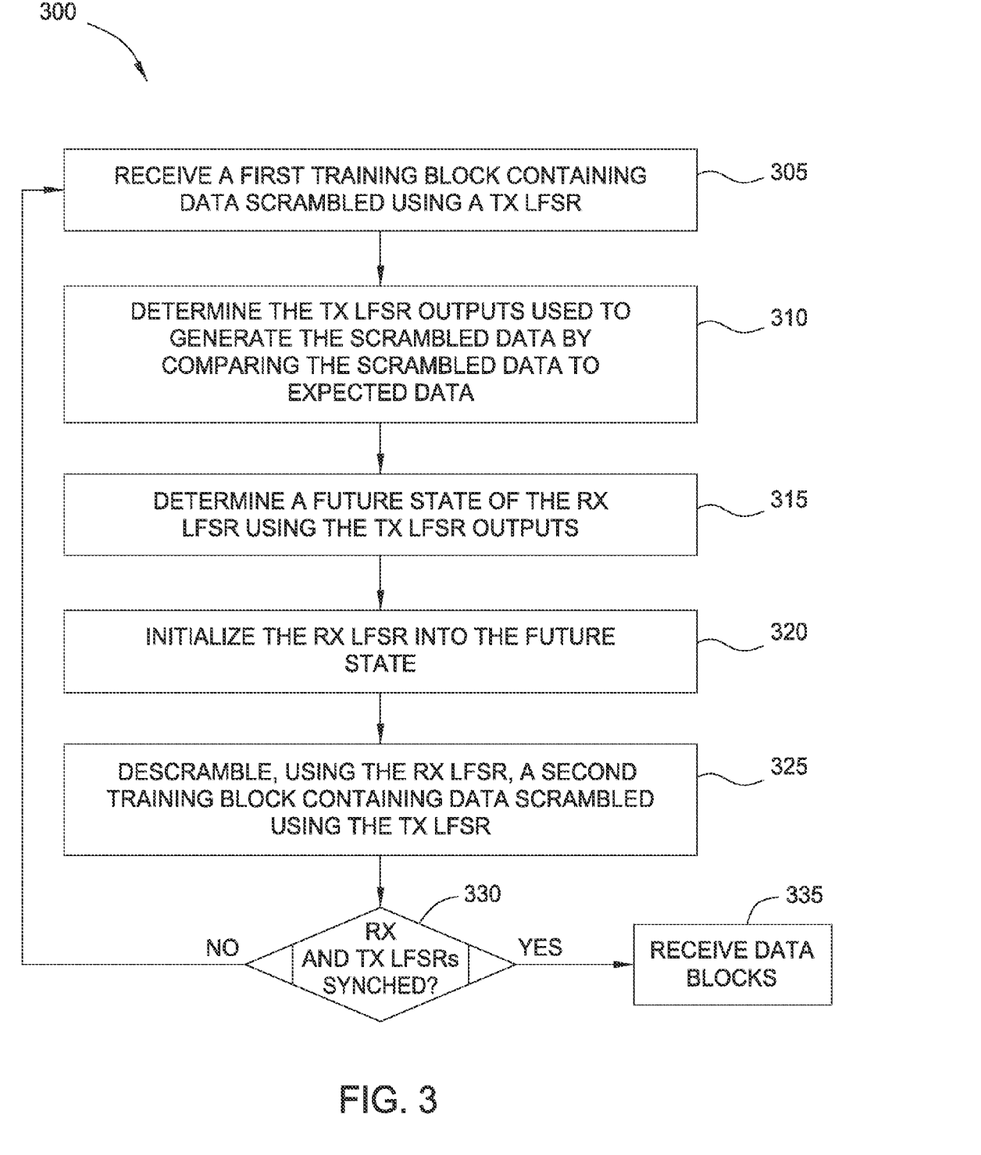
FIG. 3 is a flow chart for synchronizing a RX LFSR with a TX LFSR, according to one embodiment.

FIG. 3 is a flow chart 300 for synchronizing a RX LFSR to a TX LFSR, according to one embodiment. To aid in explaining the different blocks in flow chart 300, FIG. 3 is discussed in tandem with FIGS. 4, 5, and 6 which illustrate different aspects of the synchronization process. At block 305, a receiving compute device receives a first training block containing a predefined sequence of data that was scrambled using a TX LFSR in a transmitting compute device. The training block may include any number of bits and is transmitted serially to the receiving compute device.

At block 310, the receiving compute device determines the TX LFSR outputs used to generate the scrambled data by comparing the scrambled data to expected data. To do so, the LFSR synchronizer 275 in FIG. 4 uses scrambled data 220 and training data 405 to generate the TX LFSR outputs 410. At stated above, the scrambled data 220 is received from the transmitting compute device. However, the training data 405 (i.e., the expected data 270 shown in FIG. 2) may be stored locally on the receiving compute device. In one embodiment, the training data 405 is the same predefined sequence of bits that was scrambled by the TX LFSR to generate the scrambled data 220. Because the transmitting compute device scrambled the data by XORing this data with consecutive outputs of the TX LFSR, then XORing the scrambled data 220 with the training data 405 yields the TX LFSR outputs 410. Put differently, by performing the same operation (e.g., XOR logic), the LFSR synchronizer 275 is able to recover the TX LFSR outputs 410 used by the transmitting compute device to generate the scrambled data 220 (assuming the scrambled data 220 was received correctly).

Figure 4:
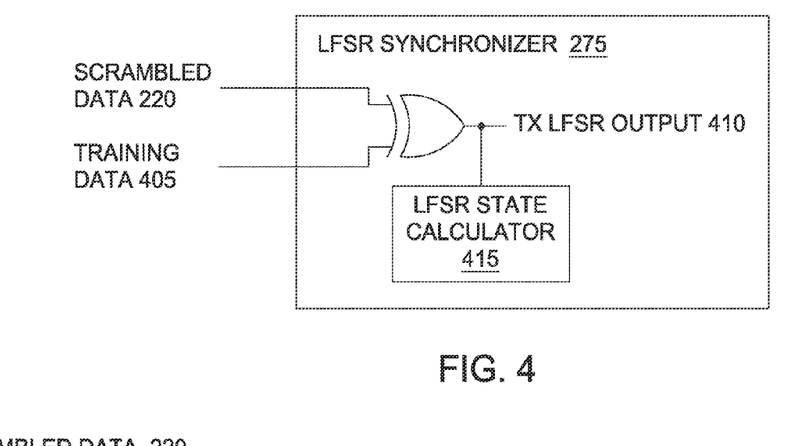
FIG. 4 is a block diagram of logic used to derive TX LFSR outputs at a receiving compute device, according to one embodiment.
Figure 5:
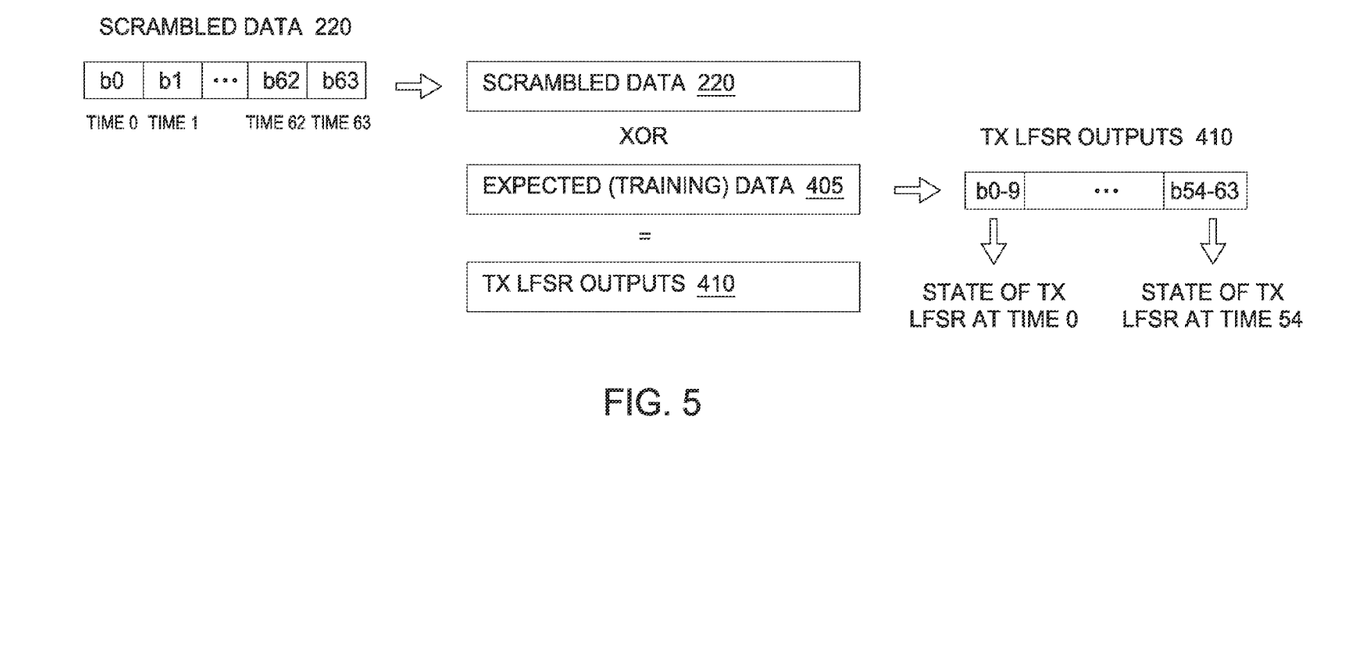
FIG. 5 illustrates operations for deriving past outputs of the TX LFSR, according to one embodiment.

FIG. 5 illustrates various operations for deriving the TX LFSR outputs 410 from the scrambled data 220. In this example, the scrambled data 220 includes 64 bits (b0-b63) which are received at Time 0-63, respectively—i.e., different clock cycles. By XORing the scrambled data 220 with the training data 405, the LFSR synchronizer 275 determines the TX LFSR outputs 410 used by the transmitting compute device to generate the scrambled data 220. From these past outputs 410, the LFSR synchronizer 275 can determine the state of the TX LFSR (i.e., the values of the individual shift registers) at different times. Because of the linear nature of a LFSR, its output is directly dependent of the values stored in its registers. Thus, by identifying the outputs 410 of the TX LFSR over time, the LFSR synchronizer 275 can determine the different values stored in the individual registers—i.e., the LFSR's state. To determine the state of the TX LFSR, the LFSR synchronizer 275 in FIG. 4 includes a LFSR state calculator 415 that identifies the state of the TX LFSR based on the TX LFSR outputs 410. Because the structure and function of the TX LFSR is known, the LFSR state calculator 415 can derive the corresponding state of the TX LFSR from the outputs 410. For example, assuming the TX LFSR includes ten registers, the calculator 415 can derive the state of the TX LFSR at Time 0 (i.e., the values stored in each of the ten registers) using b0-b9 of the TX LFSR output 410. Put differently, because the outputs 410 of the TX LFSR during times Time 0-Time 9 (i.e., b0-b9) are known, the LFSR state calculator 415 can reverse the LFSR linear process to identify the state of the TX LFSR at Time 0. By reversing the process, the LFSR state calculator 415 derives the actual values stored in the registers of the TX LFSR during Time 0. In another example, the LFSR state calculator 410 can use bits b54-b63 which were received during Time 54-Time 63 to derive the state of the TX LFSR at Time 54. In this manner, the LFSR state calculator 415 can use a predefined number of bits from the TX LFSR output 410 (e.g., any ten consecutive bits) in order to derive the state of the TX LFSR during a particular time.

Returning to FIG. 3, at block 315, the LFSR state calculator 415 determines a future state of the RX LFSR using the TX LFSR outputs. In one embodiment, the LFSR state calculator 415 determines a state of the RX LFSR which corresponds to a future state of the TX LFSR used to scramble a second, subsequent training block transmitted to the receiving compute device. Referring again to FIG. 5, the LFSR state calculator 415 can use any of the ten bit blocks of the TX LFSR output 410 to derive a state of the TX LFSR from Time 0 to Time 54. However, when the TX LFSR scrambles the second training block (i.e., the next 64-bit data block containing the predefined bit sequence), it will have advanced to a different state. However, because the LFSR state calculator 415 knows the structure and function of the TX LFSR, it can use the TX LFSR output 410 to calculate the outputs that correspond to the future state of the TX LFSR—i.e., the state of the TX LFSR at Time 64 when the first bit of the second training block is scrambled and sent to the receiving computing device.

Figure 6:
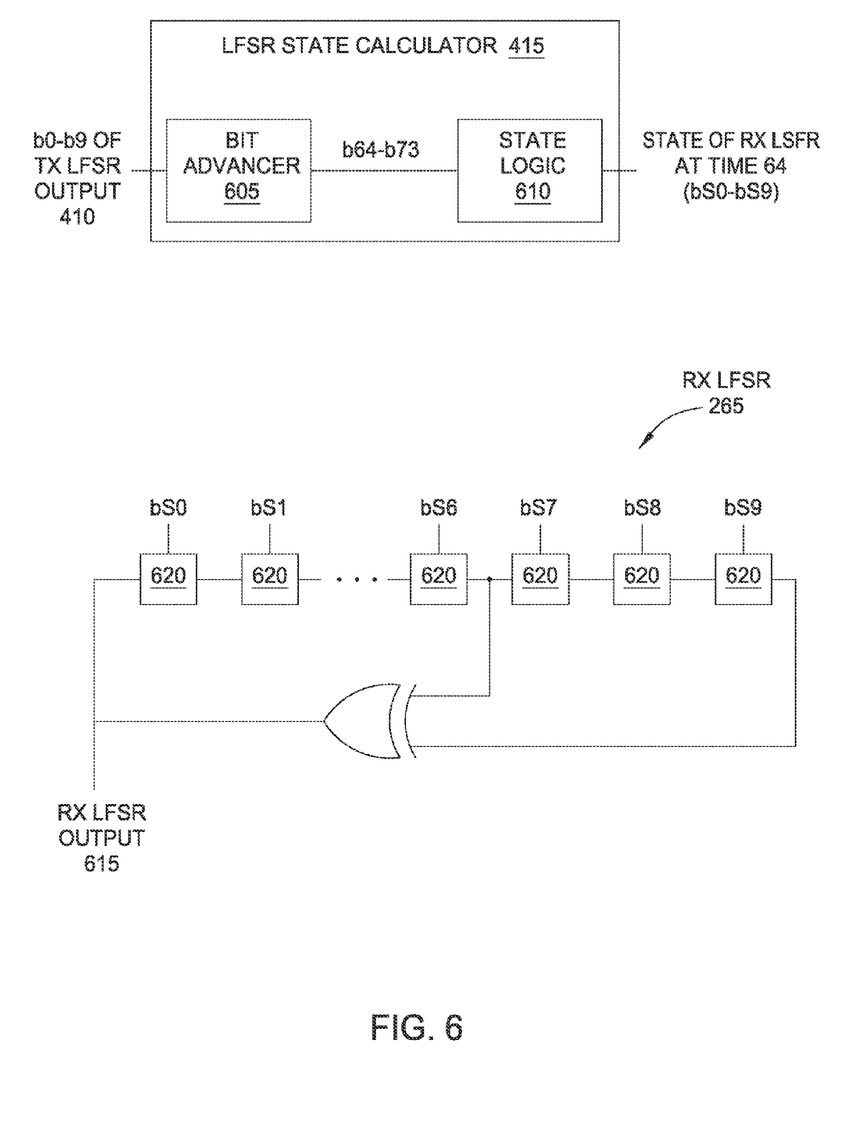
FIG. 6 illustrates operations for initializing a state of the RX LFSR, according to one embodiment.

FIG. 6 illustrates using the LFSR state calculator 415 to determine the TX LFSR outputs that correspond to the future state of the TX LFSR at Time 64 when the second training block is scrambled. As shown, bits b0-b9 of the TX LFSR output 410 are fed into a bit advancer 605 which then advances the bits 64 time periods to output bits b64-b73. That is, the bid advancer 605 determines, given the values b0-b9, the output of the TX LFSR during Time 64-Time 73. To do so, the bid advancer 605 simulates the function of TX LFSR to advance the outputs 64 clock cycles. Because the number of clock cycles needed to advance the LFSR output can be pre-programmed into the bit advancer 605, the bit advancer 605 may include logic that performs a series of XOR operations using the known TX LSFR outputs (e.g., b0-b9) to identify the future TX LFSR outputs (e.g., b64-b73). The bit advancer 605 can perform these XOR operations in only 1-4 clock cycles rather than the 64 clock cycles it will take before the TX LFSR on the transmitting computing device outputs these bits. Thus, although it is not necessary to use b0-b9 to determine b64-b73, it may be advantageous to do so since this gives the most time to determine b64-73 and initialize the RX LFSR to the correct state before the second training block is received at Time 64.

Once the future TX LFSR outputs (e.g., b64-b73) are known, the LFSR calculator 415 uses state logic 610 to derive the future state of the TX LSFR at Time 64, thereby determining what the state of the RX LSFR should be initialized to. That is, the output of logic 610 provides bits bS0-bS9 which when stored in the registers of the RX LSFR, put this LSFR in the same state as the state of the TX LSFR at Time 64. Thus, so long as the RX LSFR is initialized before Time 64 is reached, then the TX and RX LFSRs are in synch when the second (scrambled) training block is received.

Returning to FIG. 3, at block 320, the LFSR state calculator initializes the RX LFSR 265 into the future state. Continuing the example above, the receiving computing device initializes the RX LFSR 265 to have the same state of the TX LFSR when the second training block will be received. FIG. 6 also illustrates a more detailed view of RX LFSR 265 where the bits defining the state of the TX LSFR at Time 64 (i.e., bS0-bS9) are individually loaded into the registers 620. Once the second training block is received, at block 325, the RX LFSR output 615 may then be used to decode the scrambled data. That is, if the first training block was correctly received, the synchronized output of the RX LSFR 615 can be used to descramble the second training block to yield the predefined bit-sequence—i.e., the descrambled training data.

At block 330, the receiving compute device determines if the RX and TX LFSRs are synchronized. As will be discussed below, the transmitting compute device may transmit multiple training blocks to the receiving compute device. If the initialized RX LFSR successfully descrambles these training blocks—i.e., the descrambled data matches the pre-defined bit-sequence of the training data—then the LFSRs are synchronized. If synched, at block 335, the transmitting compute device begins transmitting data blocks to the receiving compute device. Unlike the training data in the training blocks, this data may not be predefined—i.e., the data blocks contain strings of logical ones and zeros that are unknown to the receiving compute device. Because the RX and TX LFSRs are synchronized, the receiving compute device can accurately descramble the data blocks and process the data. However, if the receiving compute device determines the TX and RX LFSRs are not synched, the flow chart 300 returns to block 305 where new initialization data for the RX LFSR is calculated using different TX LFSR outputs.

In another embodiment, the LFSR state calculator 415 may use the TX LFSR outputs 410 to calculate future TX LFSR outputs and determine if these outputs match received TX LFSR outputs. That is, instead of descrambling the second training block using the initialized RX LFSR to determine if the RX and TX LFSRs are synchronized, the LFSR state calculator 415 may use the bit advancer 605 to identify future TX LFSR outputs and determine if these outputs match the TX LFSR outputs identified using the XOR operation shown in FIG. 5. For example, using b0-b9 of the TX LFSR outputs 410, the bit advancer 605 can calculate b54-b63. Then, at Time 63 when bits b54-b63 of the TX LFSR 410 have been received and identified using the logic shown in FIG. 5, the LFSR state calculator 415 can compare the values of b54-b63 that were calculated by the bit advancer 605 to the values identified by XORing the scrambled data 220 with the training data 405. If these values match, then the RX and TX LFSRs are synchronized.

In this example, the LFSR state calculator 415 uses the earlier bits in the TX LFSR output 410 (e.g., b0-b9) to predict the future TX LFSR outputs and determine if these future outputs match the TX LFSR outputs 410 derived from the scrambled data 220 which was actually received (e.g., b54-63). Although this example discusses using bit sequences in the same training block, the same technique may be used across multiple training blocks. For example, the bit advancer 605 can use b0-b9 (or even more bits) from the first training block to calculate b64-b73 from the second training block. Once the second training block is received and XORed with the training data 405, the receiving computing device can compare b64-b73 from this operation to the values calculated by the bit advancer 605 to determine if they match. In this embodiment, the second computing device does not need to initialize the RX LFSR output before determining whether the LFSRs are in synch. Stated differently, the receiving computing device may first determine using the bit advancer 605 whether predicted TX LFSR outputs match the actual TX LFSR outputs 410 over one or more training blocks before determining a future state of the TX LFSR and initializing the RX LFSR 265 to match that state as shown in FIG. 6. Thus, the receiving computing device can determine that it has the correct information for synchronizing the RX LFSR 265 to the TX LFSR before the RX LFSR is initialized and used to descramble incoming training blocks.

Furthermore, the receiving compute device may perform both checks. That is, the receiving compute device may determine using the bit advancer 605 whether predicted TX LFSR outputs match the actual TX LFSR outputs 410 before determining a future state of the TX LFSR as well as initialing the RX LFSR 265 and ensuring its output (i.e., descrambled data) matches the pre-defined bit-sequence of the training data.

The structures and functions of the LFSR synchronizer 275 and LFSR state calculator 415 shown in FIGS. 4 and 6 may be implemented in the receiving compute device as software, firmware, hardware or some combination thereof.

Figure 7:
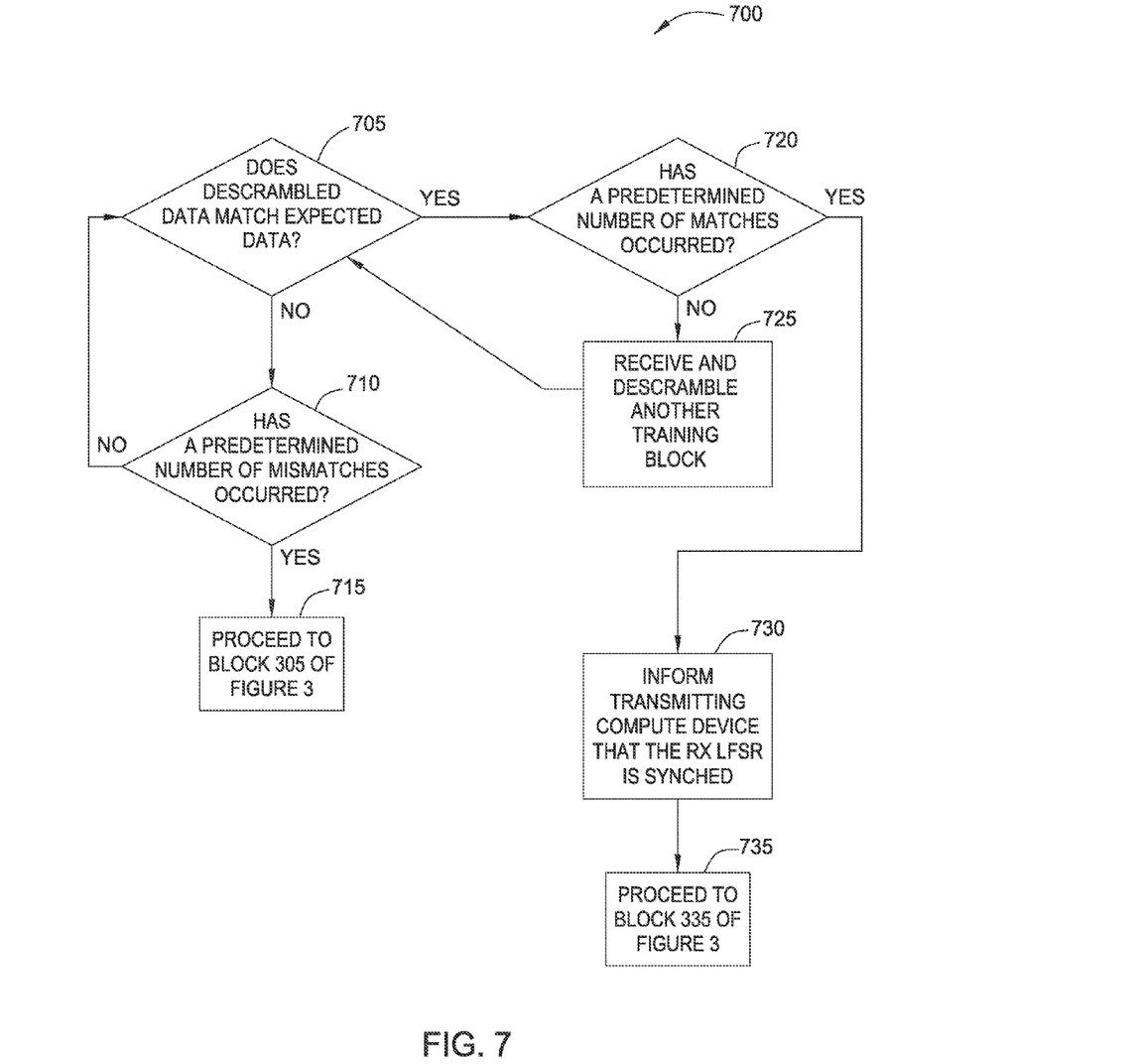
FIG. 7 is a flow chart for determining if the RX and TX LFSRs are synchronized, according to one embodiment.

FIG. 7 is a flow chart 700 for determining if the RX and TX LFSRs are synchronized, according to one embodiment. More specifically, flow chart 700 describes a more detailed process used to perform query block 330 in FIG. 3 where the receiving computing device determines if the RX and TX LFSRs are synched. The process begins at block 705 where the receiving computing device determines whether the data descrambled using the initialized RX LFSR matches the expected training data. In one embodiment, the RX LFSR descrambles data contained in a second training block that follows in time a first training block which was used to initialize the RX LFSR as described in FIG. 3. Moreover, in the additional embodiment described above, the receiving compute device uses the TX LFSR outputs 410 in FIG. 5 to calculate future TX LFSR outputs and determine if these outputs match TX LFSR outputs that are derived later, or some combination of the two embodiments. One advantage of combining the two techniques for determining if the RX and TX LFSRs are synchronized is that there is a chance that the bits used to calculate the further TX LFSR values may have been corrupted which will be identified once the RX LFSR has been initialized and its descrambled data is compared to the predetermined training data stored on the receiving compute device.

Regardless of which technique is used, if there is not a match, the flow chart 700 proceeds to block 710 where the receiving compute device determines if a predetermined number of mismatches occurred. For example, the compute device may receive multiple training blocks and determine if the received data matches expected data. In one embodiment, the predetermined number of mismatches may be two. Thus, if the receiving compute device detects only one mismatch, then the flow chart 700 returns to block 705 where a subsequent training block is received and evaluated. However, if two mismatches have been detected on two different training blocks, at block 715 the flow chart 700 returns to block 305 of FIG. 3. That is, the receiving compute device repeats the process illustrated in FIG. 3 for determining a future state of the TX LFSR which can then be used to initialize the RX LFSR.

However, if at block 705 the receiving compute device determines that the received data matches the expected data, the flow chart 705 proceeds to block 720 to determine if a predetermined number of matches has occurred. For example, the receiving compute device may require five matches in a row before determining that the RX and TX LFSRs are synchronized. By requiring multiple matches, the receiving compute device may catch transmission errors that arise intermittently or occur only after several transmissions of training blocks.

If the requisite number of matches has not been detected, the flow chart 700 returns to block 705 to determine if data from a subsequent training block matches the expected data. However, if the condition at block 720 is satisfied, at block 730 the receiving compute device informs the transmitting compute device that the RX LFSR is in synch with the TX LFSR. To do so, the receiving compute device may transmit a different predefined data block (e.g., a second training data) to the transmitting compute device. Put differently, the receiving compute device indicates to the transmitting compute device that its LFSR is now synched by transmitted the second, different training data to the transmitting compute device. By determining the descrambled data includes the predefined bit sequence of the second training block, the transmitting compute device knows the RX LFSR on the receiving computing device is now synched with its LFSR.

At block 735, the flow chart 700 proceeds to block 335 of FIG. 3 where the receiving and transmitting compute device begins normal operations. Now that the RX and TX LFSRs are synched, the two compute devices can send data blocks that contain data that is unknown to the other device instead of the predefined training data. Referring again to FIG. 2, compute device 205 uses the TX LFSR 210 to scramble data out 215 (which represents data that is unknown to compute device 250) and transmit it to compute device 250. Because the RX and TX LFSRs 210, 265 are synched, compute device 250 can XOR the output of RX LFSR 265 with the scrambled data 220 to generate the descrambled data 280, which is the same as data out 215.

In one embodiment, flow chart 700 may repeat using different training blocks that contain a different predefined bit sequence. That is, once the receiving compute device informs the transmitting compute device that the TX and RX LFSRs are in synch at block 730, in response, the transmitting compute device begins transmitting the different training blocks to the receiving compute device. These training blocks may have a bit sequence designed to catch different errors in the communication link between the devices than the bit sequence in the training data described above. However, if at block 720 the requisite number of matches is successfully detected using the new training data, the receiving compute device may transmit back to the transmitting compute device the new training data thereby indicating the TX and RX LFSRs are still in synch and normal operation can begin.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages provided above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   receiving on a first compute device first training data scrambled using a transmitting linear-feedback shift register (LFSR) on a second compute device;
   determining a first set of past output values used by the transmitting LFSR to scramble the first training data by comparing the first training data with expected data stored on the first compute device;
   determining future output values of the transmitting LFSR based on the first set of past output values;
   receiving on the first compute device second training data scrambled using the transmitting LFSR;
   determining a second set of past output values used by the transmitting LFSR to scramble the second training data by comparing the second training data with the expected data; and
   upon determining the future output values match the second set of past output values, synchronizing a receiving LFSR on the first compute device to the transmitting LFSR.

2. The method of claim 1, wherein comparing the first training data with the expected data to determine the first set of past output values comprises:
   performing an xor operation on the first training data and the expected data to generate the first set of past output values, wherein the expected data comprises a predefined bit sequence that matches the first training data before being scrambled using the transmitting LFSR, and
   wherein comparing the second training data with the expected data to determine the second set of past output values comprises:
   performing the xor operation on the second training data and the expected data to generate the second set of past output values, wherein the predefined bit sequence matches the second training data before being scrambled using the transmitting LFSR.

3. The method of claim 1, wherein determining the future output values comprises:

performing a plurality of xor operations using the past output values to generate the future output values of the transmitting LFSR, wherein the future output values are generated before the transmitting LFSR is in a future state corresponding to the future output values.

4. The method of claim 1, wherein the first training data is received at the first compute device before the second training data, and wherein the future output values are determined before the second training data is received by the first compute device.

5. The method of claim 1, wherein synchronizing the receiving LFSR comprises:

identifying a plurality of registers values defining a future state of the transmitting LFSR; and initializing the receiving LFSR using the plurality of register values to synchronize the receiving LFSR with the transmitting LFSR.

6. The method of claim 5, further comprising, after initializing the receiving LFSR:

descrambling a scrambled data block received from the second compute device using the receiving LFSR, wherein the receiving LFSR is part of an additive descrambler in the first compute device.

7. The method of claim 1, wherein the first and second sets of past output values of the transmitting LFSR comprise a bit sequence representing at least part of a past states of the transmitting LFSR used to generate respective bits in the first and second training data.

* * * * *